Jan. 21, 1958 G. P. MONET 2,820,759
METHOD OF SEPARATING FROTHS FROM LIQUIDS
Filed May 4, 1954
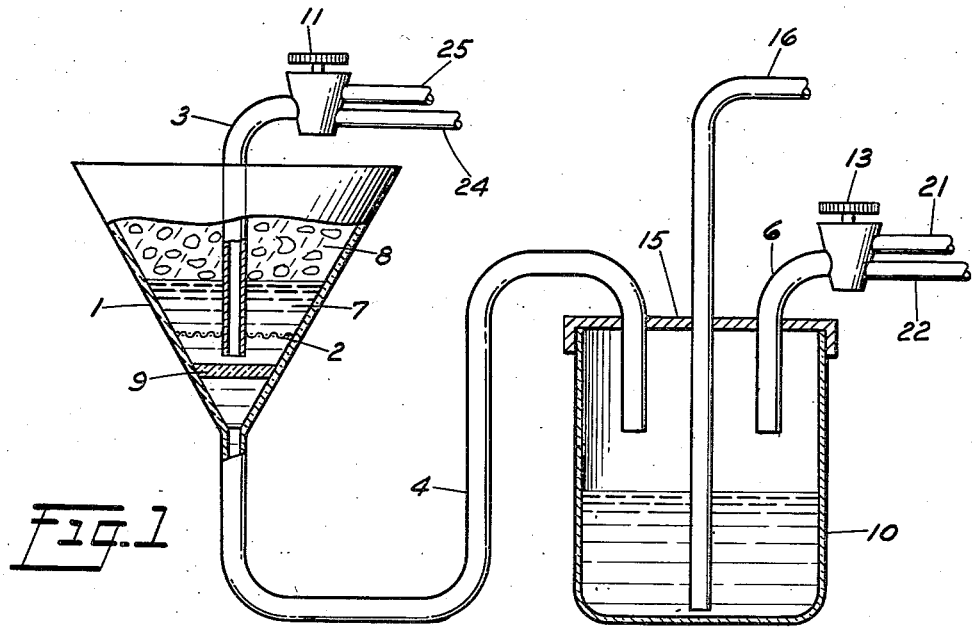
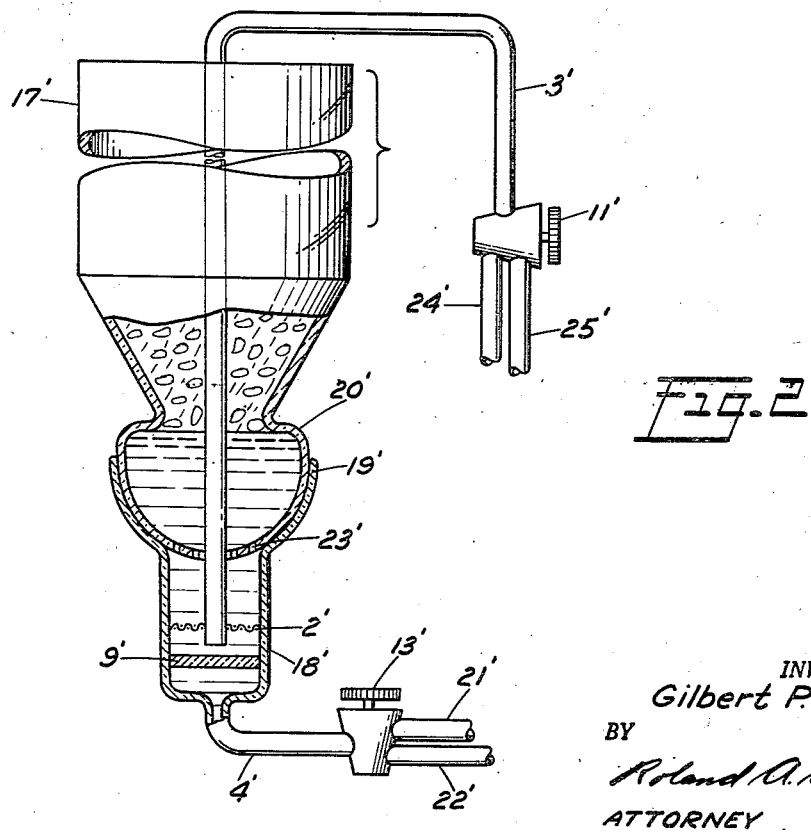
INVENTOR.
Gilbert P. Monet
BY
Roland A. Anderson
ATTORNEY

United States Patent Office 2,820,759
Patented Jan. 21, 1958

2,820,759
METHOD OF SEPARATING FROTHS FROM LIQUIDS

Gilbert P. Monet, Wilmington, Del., assignor to the United States of America as represented by the United States Atomic Energy Commission Application May 4, 1954, Serial No. 427,686

2 Claims. (Cl. 210—44)

This invention relates to filter systems, and more particularly to a filter arrangement for separating solids from liquids, and is a continuation-in-part of my prior application, Serial No. 115,661, filed September 14, 1949 (now abandoned.)

In the handling of liquids containing radioactive materials such as fission products, it is necessary to carry out all operations behind barriers or within shielded compartments in order to protect the operating personnel against contamination or the harmful effects of radiation. As the art has developed and expanded, it has become necessary to carry out many chemical reactions and many operations in such compartments and by remote control. An example of the problems which arise out of this work and the precautions which must be taken to meet these problems, is indicated in the copending application of Selkirk, Ser. No. 16,901, Patent No. 2,756,925, granted July 31, 1956.

Under ordinary conditions crystalline substances such as sodium uranyl acetate might be separated from liquids by the conventional methods including settling, filtration or centrifuging but these techniques cannot be readily applied to mixtures and/or solutions containing fission products due to the necessity for carrying out the procedures by remote control and from behind protecting barriers. For instance, experience with precipitate separations by centrifugation of such substances as bismuth phosphate and lanthanum fluoride in connection with the recovery of Pu, and with settling in the separation of precipitates such as $Ba^{140}$, from highly radioactive or "hot" solutions, there have been disadvantages in remote control, since such operations have generally required equipment with moving parts including valves which may be subject to frequent failure or leakage, requiring the closing down of operations and necessitating large scale decontamination procedures before repairs can be made and production resumed.

While the art of flotation, formerly known as forth flotation, is an old one, having been used for many years to concentrate large quantities of various ores, and to separate coal from slate and rock in mining operations, its application to the remote control operations of the present character does not appear to have been heretofore recognized or suggested.

Applicant with a knowledge of the problems of the prior art has for an object of his invention the provision of a system for securing a high degree of recovery of precipitates from liquids by frothing to separate the precipitate from the liquid, then recovering the precipitate from the froth.

Applicant has as another object of his invention the provision of a system for the flotation, separation and recovery of precipitates from liquids which readily insures a rapid substantially complete separation of the precipitate bearing froth from the liquid.

Applicant has as another object of his invention the provision of a system for the recovery of precipitate by flotation having an improved arrangement for the separation of the precipitate from the liquid.

Applicant has as a further object of his invention the provision of a system for the recovery of precipitates from liquids with a froth support at a predetermined line of demarcation between the froth and the liquid, to aid in the separation of froth from the liquid.

Applicant has as a still further object of his invention the provision of a system for the quick, easy and complete recovery of precipitate from liquids by the introduction and maintenance of a gas seal between the contacting surfaces of the froth and the liquid, while such liquid is being removed.

Applicant has as a still further object of his invention the provision of a flotation system for the separation of radioactive isotopes that appear in colloidal solutions including dilute acid solutions of zirconium, columbium, lanthanum and the like.

Other objects and advantages of my invention will appear from the following specification and accompanying drawings and the novel features thereof will be particularly pointed out in the annexed claims.

In the drawings, Fig. 1 is a schematic, partly in section, of one form of my improved flotation system for recovering precipitates from liquid. Fig. 2 is a schematic, partly in section, of a modified form of my improved flotation system.

This improved system is not only useful on a laboratory scale but has particular application to the general art of remote control systems for handling highly radioactive materials behind shields or barriers as exemplified generally in the prior co-pending application of Leverett et al., Ser. No. 61,322, Patent No. 2,718,459, granted September 20, 1955.

In the system, air or gas dispersion disks, particularly of fritted glass, were employed for cooperation with the air or other gas supply to produce improved frothing, and would float up to 99% of the precipitate, such as sodium uranyl acetate, at room temperature. Many surface active agents might be used for producing froths on aqueous solutions under flow sheet conditions for precipitating such substances as sodium uranyl acetate. However, duration time or life of the froth produced by the frothing agent greatly limited the materials which might be satisfactorily utilized.

It was found that small quantities of Fe(III), Cr(III) and Ni(II) up to 100 mg./liter did not appreciably effect the U losses. Small quantities of $Al(NO_3)_3$ and NaF gave larger U losses in direct proportion to the amount present. Nitric acid concentrations greater than 0.1 M also gave large U losses and no precipitation could be made with a concentration of 0.5 M or greater. Concentrations of 0.1 M or lower did not affect the U losses except that when no nitric acid was present the U losses were higher by a factor of 10.

Referring to the drawings in detail, 1 designates a container into which the precipitate containing liquid is fed. While this container in its preferred form is shown as conical in configuration, and has tapered walls, it will be understood that such container may take any other desired form. This configuration was selected in the preferred embodiment of the invention since the liquid remaining in the bottom would be a minimum. The same result, when desired, might have been accomplished in various other ways, such as by employing a vessel with straight walls but having a small basin in the bottom. The froth formed on the liquid 7 is generally designated 8 and serves to separate the precipitate from the liquid and carry it in the manner described hereinafter. The lower end of container 1 merges into and/or communicates with a tube or line 4 which extends into the upper extremity of vessel or reservoir 10, enclosed or sealed by a cover 15 with a rim telescoped thereover, and terminates in the vessel or reservoir near its upper extremity. Also extending through cover 15 and terminating in the upper extremity of the vessel or reservoir 10 is a line 6 which may be selectively connected through the valve 13 to either a line 22 for the application of gas, as in the form of air for producing bubbles, or to a line 21 for application of a vacuum, to siphon out solution from container 1. Positioned at any suitable location in the lower portion of container 1 and carried by its walls is a dispersion disk 9 of fritted glass, porcelain or other suitable porous material. Positioned above the disk 9 and engageable with the walls of the container 1 is a barrier in the form of a screen 2 which is pervious to liquids, and extending down through container 1, centrally, to a point beneath the screen 2 is a line 3. The line 3 extends beyond the upper extremity of the container 1, and positioned in the line at a suitable point beyond the upper extremity of the container is a valve 11. Also connected into the valve 11 are lines 25 and 24 for the selective application of air or other gas, and of a vacuum pressure, respectively, to the line 3.

In its operation, liquid is supplied to the upper portion of the container through a line or by other appropriate means (not shown), and may either be reacted before or after its entry into the container 1 to form a precipitate. Valve 13 is operated to bring line 22 into communication with line 6 and gas is applied through lines 6 and 4 to the lower extremity of container 1. The gas led to the lower portion of the container is dispersed as it passes up through the disk 9. The gas flow may be regulated to give an even distribution of gas bubbles of substantially uniform size from preferably a 40 mm., medium porosity, glass disk 9. Surface active frothing agents were fed or supplied to the liquid in the container 1, and the bubbles passing upwardly from the disk 9 produced froth which accumulated on the surface of the liquid. The frothing operation was continued until a maximum of stable froth was obtained using a surface active agent with a concentration of about 0.02 to 0.05 percent. This procedure was usually effective in carrying greater than 99 percent of the precipitate into the froth in a very short time, usually from 2 to 5 minutes. After the frothing step had been completed and most of the gas bubbles had gone into the froth, the valve 13 was operated to cut off gas flow and to bring line 21 into communication with lines 6 and 4 so that a vacuum pressure could be applied to the liquid in the lower portion of container 1 to draw it off through line 4 into storage vessel or reservoir 10. When the level of the liquid reached the screen 2, valve 11 was operated or turned to bring line 25 into communication with line 3 and a small amount of air was supplied from the air supply or source through line 3 so that the air entering container 1 below screen 2 served to displace the liquid as it was drawn off through line 4 by the vacuum acting through lines 4 and 6, and this formed an air seal between the froth and the liquid. In this way the interfaces between liquid 7 and froth 8 were effectively separated. The rate of liquid drawn off and air supplied through line 3 can be regulated evenly so that the froth remains above the screen while the remainder of the liquid is removed from the lower portion of container 1.

After the above operation is completed the valves 11 and 13 are closed or operated to break communication between lines 21 and 6 and lines 25 and 3, and the precipitate bearing froths are washed down into the bottom of the container 1 with a suitable solution or mixture, such as with a 3 percent nitric acid solution. More rapid dissolution of the precipitate in the solution may be accomplished by operating valve 13 to bring line 22 into communication with line 6 and apply gas in the form of air to agitate the solution in container 1. A considerable amount of froth may be produced during the dissolving step but will likely carry away very little of the precipitate.

The best results were obtained by adding only half of the acid solution, agitating and removing to vessel 10 by applying a vacuum through line 6, valve 13, and line 21, and then adding the remainder of the solution and repeating this procedure. The agitation of the second batch of the solution will likely produce very little froth. Thereafter, the precipitate may be readily separated from the solution by known conventional methods.

As an optional arrangement for removing the contents of vessel 10 to other vessels from time to time, a line 16 may extend down through cover 15 and terminate adjacent the bottom of the vessel. Vacuum may then be applied to the line 16 to draw the contents of the vessel up through it.

Numerous frothing agents are suitable for use with this invention. In general, frothing agents selected from high molecular weight polyethylene alcohols, characterized by the general formula $R(OCH_2CH_2)_xOH$ have been found to be more satisfactory. However, particularly successful results have been achieved with the polyethylene glycol alkyl aryl ether (Triton NE), 1947 Chemical Abstracts 6422g. While it is preferable to employ octylphenoxypolyethoxyethanol, which is readily available under the trade name of Triton X-100, a 33% aqueous solution (by weight), is most desirable, and is commercially available under the trade name Triton NE, 1951 Chemical Abstracts 6901a. Triton NE was found to be one of the best agents, both as a collector and as a frother. As high as 12 volumes of froth were produced using 0.2 percent Triton NE in an aqueous solution with a sodium uranyl acetate precipitate at room temperature. This agent gave consistently high percentages of precipitate floated, and the most efficient concentration was found to be 0.02–0.04 percent. For instance, a concentration of the wetting agent of 0.02 percent appeared more satisfactory than 1–2 percent Triton NE from the standpoint of coagulation of the precipitate. Ten fold lower concentration (0.02%) appeared equally satisfactory but 0.2 percent concentration was tested further for yield and decontamination. Concentration of 0.01 percent or less did not produce sufficient froth to hold the precipitate after the bubbling was stopped. Other preferred frothing agents include the poly oxy ethylene ethers of Oleyl alcohol. Still another satisfactory agent is obtained by substituting stearic acid for the coconut oil acids of Example No. 1 of the patent to Kritchevsky, No. 2,096,749, issued October 26, 1937, for "Derivatives of Alkylolamine Condensation Products."

In the application of this flotation technique to the specific example of sodium uranyl acetate precipitates on a 500 ml. scale batchwise separation, the solutions contained 5 M sodium nitrate, 0.5 M sodium acetate, 0.1 M nitric acid, and contained 25 mg. of U per ml. Precipitation was made at 70° C. and digested for one hour at 70° C. The solution was cooled to room temperature and the surface active agent was added and agitated for 15 minutes. After cooling to room temperature and adding surface active agent equivalent to 0.02 to 0.05 percent, agitation was continued for 15 minutes, during the first 3 to 5 minutes of which time, more than 99 percent of the precipitate was recovered.

In the modification of Fig. 2, which was particularly useful in connection with the substitution of several types of disks 9', the flotation container is replaced by a two part container 17', 18'. The lower portion 18' terminates in a semispherical socket portion 19' adjacent its upper end. This socket portion is adapted to receive a semispherical ball portion 20', and when adapted to laboratory use, a ball and socket ground glass joint is created through cooperation of these mating portions. In this arrangement the fritted glass disk or other porous element 9' is positioned in the lower portion 18' of the container while the screen 2' is also positioned therein and spaced upwardly therefrom. The line 3', for applying gas or a vacuum pressure to the system, extends downwardly through the ball portion 20' of the upper container portion 17' and terminates below the screen 2'. Tubing 4' leading from the lower extremity of container portion 18' terminates in valve 13' which controls the vacuum and air pressures from lines 21' and 22', respectively.

In its operation this modification functions very much the same as that previously described in connection with Fig. 1. After the liquid containing precipitate in container portions 17', 18' is ready for separation, valve 13' is operated to bring line 22' into communication with line 4' and air or other suitable gas is supplied through lines 22' and 4' to the lower portion 18' of the container. This air moves up through the porous disk 9' where it is dispersed and bubbles rise through screen 2' and through openings 23' in the ball 20' of the upper container portion 17'. With the frothing agent supplied to the liquid in container portion 17', the froth is created by the bubbles passing up through this container portion. When the frothing operation is completed, valve 13' is again operated to bring line 21' into communication with line 4' so that vacuum pressure can be applied through line 21' and line 4' to remove the liquid from the lower portion 18' of the container. At about the time when the line of demarcation between the froth and the liquid reaches the screen 2', the valve 11' is turned to bring line 25' into communication with line 3' so that air from line 25' is slowly passed downwardly through line 3' to displace the liquid as it is drawn out through lines 4' and 21'. When this operation is completed, valves 11' and 13' are closed or turned to break communication between lines 25' and 3' and lines 4' and 21' and action is taken, as heretofore described in connection with the modification of Fig. 1, to separate the froth from the precipitate. In this modification, as in the previous one, the line 3' may be employed to decant unfiltered samples of the supernatant from the container portions 17' and 18' by application of a vacuum pressure through line 24'.

Having thus described my invention, I claim:

1. A method of separating solids from liquids comprising the steps of introducing a flow of gas into the lower portion of a liquid bath to agitate it, adding a surface active agent to the mixture, dispersing the gas as it passes up through the liquid of the bath to initiate frothing, passing the liquid through a liquid pervious barrier to separate the froth from the liquid and lend support to the froth, and introducing a gas between the froth and the liquid to provide a gaseous seal for separating them.

2. A method of separating solids from liquids comprising the steps of adding a stable froth producing agent to a bath of a solid bearing liquid, introducing a continuous flow of gas into the lower portion of the liquid bath to agitate it, dispersing the gas as it passes through the liquid to initiate and sustain frothing for the separation of solids, passing the liquid through a liquid pervious barrier to aid in their separation and lend support to the froth, directing a gas stream between the froth and the liquid to form a layer of gas for separating the froth and liquid and provide a gas seal, and then removing the liquid.

References Cited in the file of this patent

UNITED STATES PATENTS

| | | |
|---|---|---|
| 1,295,817 | Towne et al. | Feb. 25, 1919 |
| 1,407,258 | Connors | Feb. 21, 1922 |
| 1,463,405 | Ruth | July 31, 1923 |
| 1,674,993 | Riley et al. | June 26, 1928 |
| 1,753,429 | Rice | Apr. 8, 1930 |
| 2,307,082 | Te Grotenhuis | Jan. 5, 1943 |
| 2,693,946 | McIlvaine | Nov. 9, 1954 |